(12) United States Patent
Iwabuchi

(10) Patent No.: US 9,402,211 B2
(45) Date of Patent: Jul. 26, 2016

(54) COMMUNICATION CONTROL METHOD, BASE STATION, RADIO TERMINAL, AND PROCESSOR

(75) Inventor: Akinori Iwabuchi, Machida (JP)

(73) Assignee: KYOCERA Corporation, Kyoto (JP)

( * ) Notice: Subject to any disclaimer, the term of this patent is extended or adjusted under 35 U.S.C. 154(b) by 114 days.

(21) Appl. No.: 14/122,190

(22) PCT Filed: May 24, 2012

(86) PCT No.: PCT/JP2012/063392
§ 371 (c)(1),
(2), (4) Date: Nov. 25, 2013

(87) PCT Pub. No.: WO2012/165308
PCT Pub. Date: Dec. 6, 2012

(65) Prior Publication Data
US 2014/0087738 A1   Mar. 27, 2014

(30) Foreign Application Priority Data

May 27, 2011   (JP) ................................ 2011-119768

(51) Int. Cl.
*H04W 36/00* (2009.01)
*H04W 52/02* (2009.01)
*H04W 24/04* (2009.01)
*H04W 36/16* (2009.01)
*H04W 36/24* (2009.01)

(52) U.S. Cl.
CPC ...... *H04W 36/0011* (2013.01); *H04W 52/0206* (2013.01); *H04W 24/04* (2013.01); *H04W 36/165* (2013.01); *H04W 36/24* (2013.01)

(58) Field of Classification Search
CPC .................. H04W 52/0277; H04W 52/0203; H04W 52/0261; H04W 52/0296; H04W 24/04; H04W 36/0011; H04W 36/165; H04W 36/24; H04W 52/0206; H04W 84/045
USPC ......... 455/13.4, 56.1, 573, 574, 127.1–127.5, 455/561, 521, 525
See application file for complete search history.

(56) References Cited

U.S. PATENT DOCUMENTS

| 4,673,826 A * | 6/1987 | Masson ........................... 307/66 |
| 8,112,097 B2 | 2/2012 | Nakayama |
| 2003/0050066 A1 | 3/2003 | Tobe et al. |
| 2008/0316949 A1 | 12/2008 | Yamamoto |

(Continued)

FOREIGN PATENT DOCUMENTS

| JP | 2002-330095 A | 11/2002 |
| JP | 2003-087840 A | 3/2003 |

(Continued)

OTHER PUBLICATIONS

International Search Report; PCT/JP2012/063392; Jun. 19, 2012.
(Continued)

*Primary Examiner* — Thai Vu
(74) *Attorney, Agent, or Firm* — Studebaker & Brackett PC

(57) ABSTRACT

A base station (10) comprises a battery (12) and is driven by power supplied from a power system or by power supplied by the battery (12). The base station (10) includes a radio communication unit (131) that sends information indicating the remaining power amount of the battery (12) to a radio terminal.

6 Claims, 4 Drawing Sheets

(56) References Cited

U.S. PATENT DOCUMENTS

| | | | |
|---|---|---|---|
| 2009/0197603 A1* | 8/2009 | Ji | H04W 36/0083 455/436 |
| 2009/0270132 A1* | 10/2009 | Nakayama | 455/561 |
| 2010/0265913 A1 | 10/2010 | Gorokhov et al. | |
| 2011/0065396 A1 | 3/2011 | Hirata | |
| 2011/0237257 A1* | 9/2011 | Soliman et al. | 455/436 |

FOREIGN PATENT DOCUMENTS

| | | |
|---|---|---|
| JP | 2005-151288 A | 6/2005 |
| JP | 2009-005170 A | 1/2009 |
| JP | 2009-267736 A | 11/2009 |
| JP | 2011-061456 A | 3/2011 |
| JP | 2011-066593 A | 3/2011 |
| WO | 2010/121199 A1 | 10/2010 |

OTHER PUBLICATIONS

3GPP TR 36.902 V9.1.0 (Mar. 2010); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).

An Office Action; "Notice of Reasons for Rejection," issued by the Japanese Patent Office on Aug. 26, 2014, which corresponds to Japanese Patent Application No. 2013-518039 and is related to U.S. Appl. No. 14/122,190; with English language statement of relevance.

An Office Action; "Notice of Reasons for Rejection," issued by the Japanese Patent Office on Mar. 10, 2015, which corresponds to Japanese Patent Application No. 2013-518039 and is related to U.S. Appl. No. 14/122,190; with English language statement of relevance.

* cited by examiner

COMMUNICATION CONTROL METHOD, BASE STATION, RADIO TERMINAL, AND PROCESSOR

TECHNICAL FIELD

The present invention relates to a communication control method, a base station, a radio terminal, and a processor in a mobile communication system that supports a SON technology.

BACKGROUND ART

In an LTE (Long Term Evolution) being standardized in 3GPP (3rd Generation Partnership Project) which is a group aiming to standardize a mobile communication system, a technology called SON (Self Organizing Network) is employed.

According to the SON technology, settings (various parameters) of a base station are expected to be automatically optimized without requiring a manual operation during the operation of the base station (see, for example, Non Patent Literature 1).

As one of SON technologies, in order to level loads of the respective base stations, there is MLB (Mobility Load Barancing) that adjusts parameters for mobility control of a radio terminal.

CITATION LIST

Non Patent Literature

[Non Patent Literature 1] 3GPP technical report "TR 36.902 V9.1.0" March 2010

SUMMARY OF INVENTION

Unfortunately, in the SON technology described above, since power circumstance that is represented by a recent massive blackout, for example, is not taken into account, there is a problem that it is impossible to perform the mobility control taking into account such power circumstance.

Accordingly, an object of the present invention is to enable mobility control taking into account power circumstance that is represented by a recent massive blackout, for example, in a mobile communication system that supports a SON technology.

To solve the above problems, the present invention includes the following features.

A feature of a communication control method according to the present invention is a method in a base station (base station 10) that includes a battery (battery 12) and is driven by power supplied from a power system or power supplied from the battery, the method comprising: a transmission step of transmitting information indicating a remaining power amount of the battery, to a radio terminal (radio terminal 20).

Another feature of the communication control method according to the present invention is, in the aforementioned feature, summarized as follows. In the transmission step, the information indicating the remaining power amount of the battery is periodically transmitted.

Another feature of the communication control method according to the present invention is, in the aforementioned feature, summarized as follows. The transmission step is executed based on a stoppage of the power supply from the power system.

Another feature of the communication control method according to the present invention is, in the aforementioned feature, summarized as follows. The communication control method further comprises: a step of detecting the stoppage of the power supply from the power system, wherein the transmission step includes a step of starting the transmission of the information indicating the remaining power amount of the battery, when the stoppage of the power supply from the power system is detected, or after a predetermined time elapses from the detection of the stoppage of the power supply from the power system.

Another feature of the communication control method according to the present invention is, in the aforementioned feature, summarized as follows. The communication control method further comprises: a step of obtaining information indicating an estimated time when the power supply from the power system is stopped, wherein the transmission step includes a step of starting the transmission of the information indicating the remaining power amount of the battery, a predetermine time prior to the estimated time when the power supply from the power system is stopped.

Another feature of the communication control method according to the present invention is, in the aforementioned feature, summarized as follows. In the transmission step, the information indicating the remaining power amount of the battery is transmitted while being included in SIB (System Information Block) defined by a 3GPP standard.

Another feature of a communication control method according to the present invention is a method in a radio terminal able to communicate with a base station that includes a battery and is driven by power supplied from a power system or power supplied from the battery, the communication control method comprising: a step of receiving information indicating a remaining power amount of the battery, from the base station; and a step of using the information indicating the remaining power amount of the battery in cell reselection.

A feature of a base station according to the present invention is summarized as a base station that includes a battery and is driven by power supplied from a power system or power supplied from the battery, the base station comprising: a transmission unit that transmits information indicating a remaining power amount of the battery, to a radio terminal.

A feature of a radio terminal according to the present invention is summarized as a radio terminal able to communicate with a base station that includes a battery and is driven by power supplied from a power system or power supplied from the battery, the radio terminal comprising: a reception unit that receives information indicating a remaining power amount of the battery, from the base station, wherein the information indicating the remaining power amount of the battery is used in cell reselection.

A feature of a radio terminal according to the present invention is summarized as a processor provided in a radio terminal able to communicate with a base station, wherein the base station includes a battery and is driven by power supplied from a power system or power supplied from the battery, and the processor is configured to perform a process for receiving, by the radio terminal, information indicating a remaining power amount of the battery from the base station, and a process for using, by the radio terminal, the information indicating a remaining power amount of the battery in cell reselection.

DESCRIPTION OF EMBODIMENTS

Figure 1:
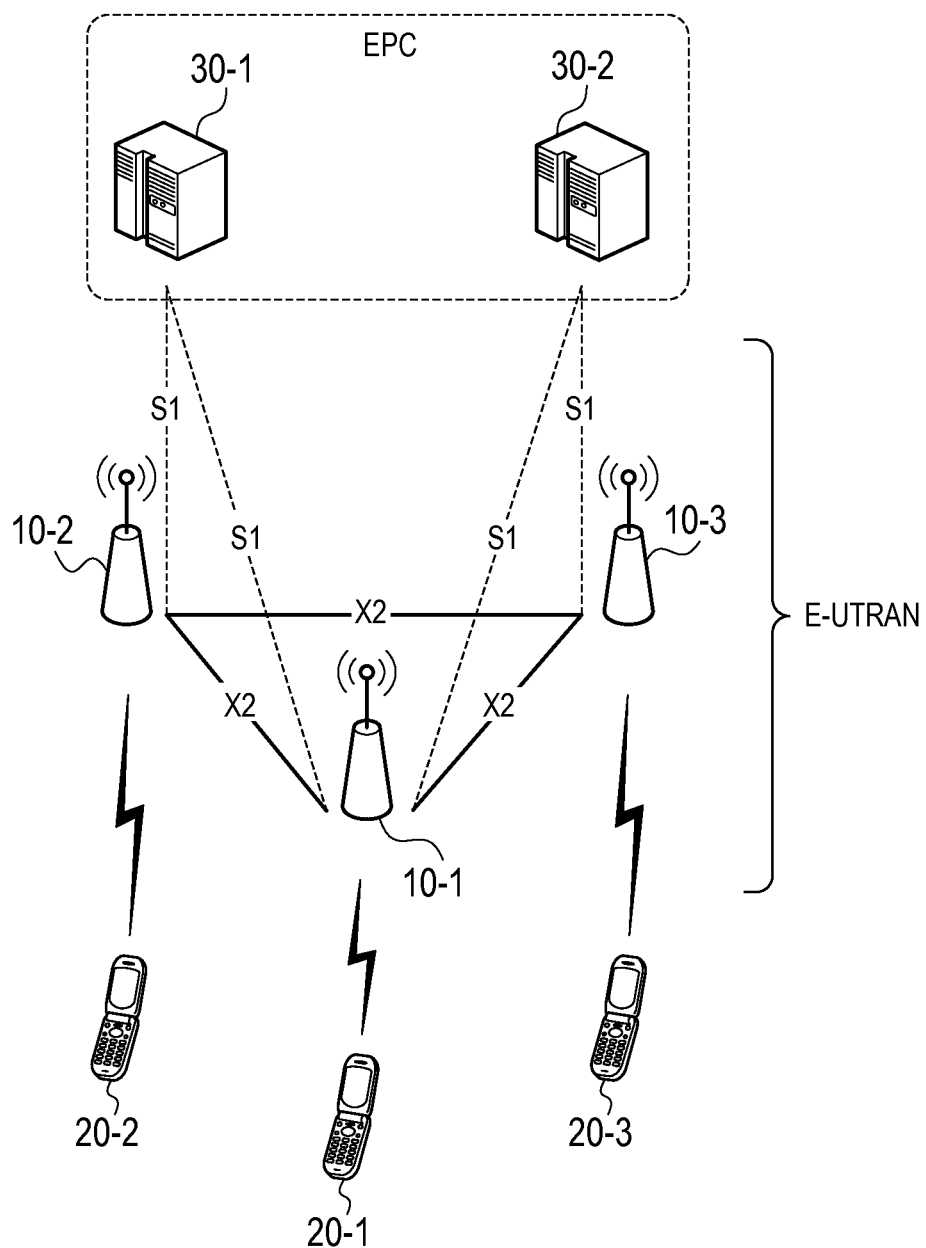
FIG. 1 is a diagram illustrating an entire configuration of a mobile communication system according to an embodiment of the present invention.

An embodiment of the present invention will be described with reference to the drawings. In the following embodiment, through the drawings, same or similar parts are assigned with same or similar reference numerals.

(1) Entire Configuration of System

FIG. 1 is a diagram illustrating an entire configuration of a mobile communication system 1. The mobile communication system 1 according to the present embodiment is configured based on an LTE Advanced (after 3GPP Release 10).

As illustrated in FIG. 1, the mobile communication system 1 includes E-UTRAN (Evolved-UMTS Terrestrial Radio Access Network) which is a radio access network. The E-UTRAN includes a plurality of base stations (eNBs; evolved Nodes B) 10.

Each of the plurality of base stations 10 is driven by power from a power system. As will be specifically described below, since the base station 10 is configured to include a battery, even though a stoppage of a power supply from the power system (namely, a blackout) occurs, the base station is configured to be driven by power accumulated in the battery.

Further, each of the plurality of base stations 10 forms one cell or a plurality of cells. Here, the cell is a minimum unit of a radio communication area where a radio terminal (UE; User Equipment) 20 can communicate.

The radio terminal 20-1 camps on a cell formed by the base station 10-1, and can communicate with the base station 10-1. The radio terminal 20-2 camps on a cell formed by the base station 10-2, and can communicate with the base station 10-2. The radio terminal 20-3 camps on a cell formed by the base station 10-3, and can communicate with the base station 10-3.

The radio terminal 20 performs switching to a cell of a base station having a better radio condition along with the movement, for example. Such switching is called handover in a connection state, and is called cell reselection in an idle state.

In the present mobile communication system, a base station to which the radio terminal 20 connects has the authority as to whether to perform handover of the radio terminal 20 and to which base station a handover is performed. On the other hand, the radio terminal 20 has the authority as to whether to perform cell reselection and decide a cell reselection destination (a standby destination).

The mobile communication system 1 supports an MLB (Mobility Load Balancing) technology which is a kind of SON technologies, and is configured to be capable of adjusting a cell range (coverage) on the basis of load information transmitted and received among the base stations in order to level loads among the base stations.

In the mobile communication system 1, an X2 interface for mutually connecting the base stations 10 (adjacent to each other) is set. The base station 10 is configured to perform communication between base stations, that is, communicate with another base station 10 adjacent to the base station 10 by using the X2 interface.

Furthermore, the mobile communication system 1 includes EPC (Evolved Packet Core) which is a core network.

The EPC includes a plurality of mobility management devices (MME; Mobility Management Entity)/gateway devices (S-GW; Serving Gateway) 30. The mobility management device is configured to perform various mobility controls on the radio terminal 20. The gateway device is configured to perform transfer control of user data transmitted and received by the radio terminal 20.

An S1 interface for connecting each of the base stations 10 to the EPC is set between the base station 10 and the EPC. The base station 10 is configured to communicate with the EPC by using the S1 interface.

(2) Configuration of Base Station

Figure 2:
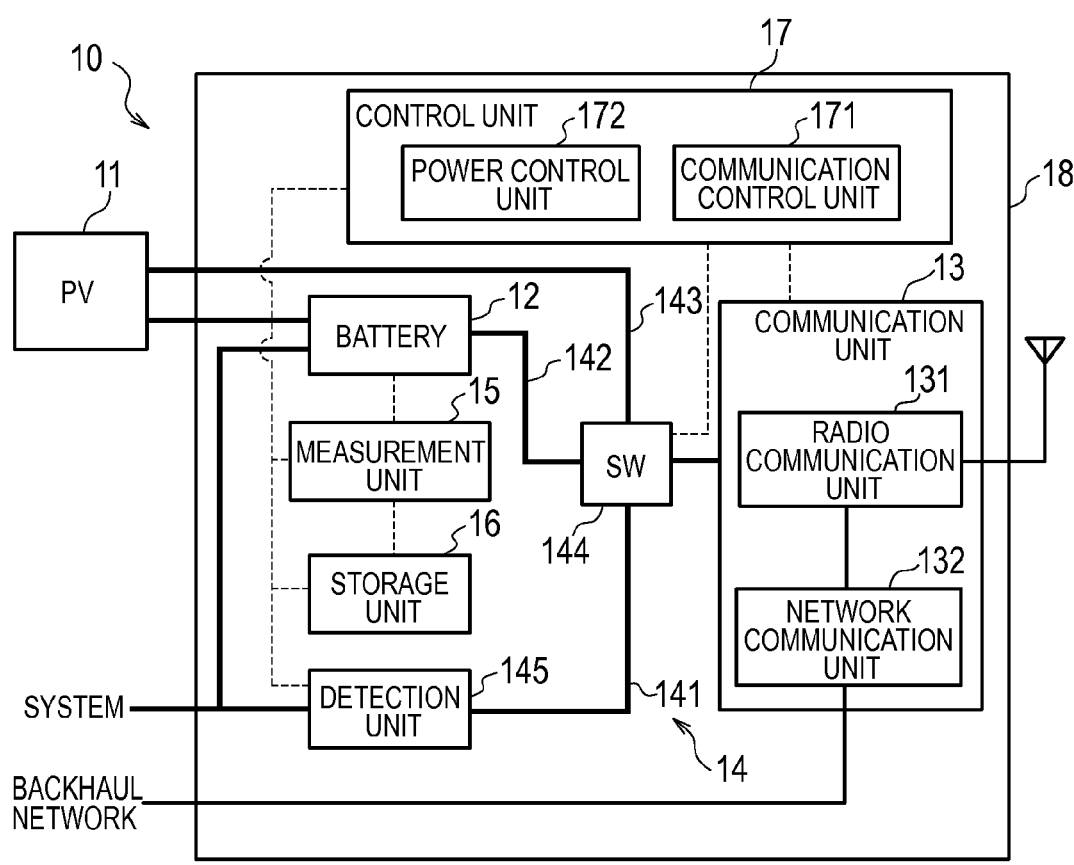
FIG. 2 is a block diagram of a base station according to the embodiment of the present invention.

Next, a configuration of the base station 10 is explained. FIG. 2 is a block diagram of the base station 10. In FIG. 2, a thick line between each block represents a power line, a thin line represents a communication signal line, and a broken line represents a control signal line. Moreover, the power system indicates a distribution system of an electric power company, and a backhaul network indicates a communication infrastructure network constructed by a communication carrier.

As illustrated in FIG. 2, the base station 10 includes a solar power generation device (hereinafter, referred to as PV) 11, a battery 12, a communication unit 13, a power transmission means 14, a measurement unit 15, a storage unit 16, and a control unit 17. In the present embodiment, the battery 12, the communication unit 13, the power transmission means 14, the measurement unit 15, the storage unit 16, and the control unit 17 are provided in a base-station main body (a case body) 18.

The PV 11 receives sunlight to generate electricity, and outputs power obtained by generating the electricity. In the present embodiment, the PV 11 is separated from the base-station main body 18, but may be integrally formed with the base-station main body 18.

In the present embodiment, a configuration where the base station 10 is provided with the PV 11 will be mainly described; however, the base station 10 may not be necessarily provided with the PV 11.

The communication unit 13 includes a radio communication unit 131 for performing radio communication with the radio terminal 20, and a network communication unit 132 for performing communication with the network side (the EPC or another base station).

The battery 12 accumulates the power generated in the PV 11 and the power from the power system, and discharges the accumulated power under the control of the control unit 17. The battery 12 is, for example, a lithium-based battery, but may be a recyclable battery used in an electric vehicle. In the base station not including the PV 11, the battery 12 may be a type of a UPS (Uninterruptible Power Supply) system that accumulates the power from the power system.

The power transmission means 14 includes a path (a first path) 141 for transmitting the power from the power system to each block of the base station 10, a path (a second path) 142 for transmitting the power from the battery 12 thereto, a path (a third path) 143 for transmitting the power from the PV thereto, and a switch (hereinafter, referred to as SW) 144 for selectively switching the respective paths.

In FIG. 2, although the paths for transmitting the power from the SW 144 to the communication unit 13 are illustrated, respective paths for transmitting the power from the SW 144 to other blocks (for example, the control unit 17) may be also provided actually.

A detection unit 145 configured to detect a stoppage (a blackout) of the power supply from the power system is provided on the first path 141. An existing technology can be used as a method of detecting the blackout. Upon detecting the blackout, the detection unit 145 notifies the control unit 17 of the detection of the blackout.

The measurement unit 15 measures the power (hereinafter, referred to as a remaining power amount) accumulated in the battery 12 under the control of the control unit 17. Upon measuring the remaining power amount, the measurement unit 15 outputs the measured result to the storage unit.

The storage unit 16 stores various information to be used for the control by the control unit 17. In the present embodiment, the storage unit 16 stores information indicating the remaining power amount obtained by the measurement unit 15.

The control unit 17 controls various functions of the base station 10. In the present embodiment, the control unit 17 includes a communication control unit 171 and a power control unit 172.

The communication control unit 171 controls the communication unit 13. Specifically, the communication control unit 171 controls radio communication (communication by the radio communication unit 131) with the radio terminal 20 and communication (communication by the network communication unit 132) using the X2 interface and the S1 interface.

The communication control unit 171 controls the radio communication unit 131 to obtain information (hereinafter, referred to as remaining power amount information) indicating a remaining power amount of the battery 12 from the storage unit 16 and to transmit the obtained remaining power amount information by using a broadcast control channel (BCCH) which is a kind of logical channels.

Here, the remaining power amount information may be a value (wattage (W)) of the remaining power amount of the battery 12, and may be an index (for example, Full: "11", Middle: "10", Low: "01", Empty: "00") indicating a level of the remaining power amount of the battery 12.

In the present embodiment, the communication control unit 171 transmits the remaining power amount information while being included in a system information block (SIB). Specifically, Battery Status IE which is an information element (IE) corresponding to the remaining power amount information is included in SIB type 3 (hereinafter, referred to as SIB3) which is a kind of SIBs and includes respective parameters primarily related to cell reselection. Respective IEs of the SIB3 other than the Battery Status IE may be the same as those of an existing SIB3 defined by a 3GPP standard (see, for example, 3GPP TS 36.331 V10.1.0 "6.3.1 System information blocks"). Since the SIB3 is periodically transmitted, the Battery Status IE is also transmitted periodically.

The power control unit 172 controls the SW 144 and the battery 12. When the blackout is detected by the detection unit 145, the power control unit 172 controls the SW 144 to supply the power from the battery 12 to the respective blocks. When the base station 10 is provided with the PV 11, the power control unit 172 controls so as to supply the power not only from the battery 12 but also from the PV 11. In this case, as to discharge control of the battery 12, the power control unit 172 preferably controls such that a deficit of the generated power by the PV 11 is covered by the battery 12 on the basis of time zone or weather information, for example.

Moreover, the power control unit 172 controls the measurement unit 15. When the detection unit 145 detects the blackout, the power control unit 172 controls the measurement unit 15 to start the measurement of the remaining power amount of the battery 12. The measurement is periodically performed (for example, every 20 msec. to several minutes). After a predetermined time elapses from the detection of the blackout, the measurement of the remaining power amount of the battery 12 may be started. Further, the power control unit 172 controls the measurement unit 15 to execute the measurement until the power supply from the power system is resumed (the measurement is not stopped until the power supply is resumed).

Furthermore, the power control unit 172 controls the storage unit 16. The power control unit 172 stores the measured result of the remaining power amount in the storage unit 16. The power control unit 172 updates the remaining power amount information stored in the storage unit 16 whenever the measurement is performed. As described above, the remaining power amount information stored in the storage unit 16 is used by the communication control unit 171.

(3) Configuration of Radio Terminal

Figure 3:
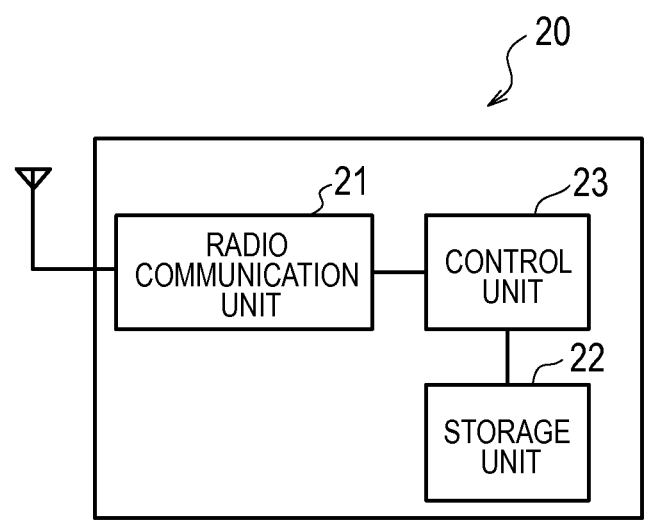
FIG. 3 is a block diagram illustrating a radio terminal according to the embodiment of the present invention.

Next, a configuration of the radio terminal 20 will be described. FIG. 3 is a block diagram illustrating the radio terminal 20.

As illustrated in FIG. 3, the radio terminal 20 includes a radio communication unit 21, a storage unit 22, and a control unit 23.

The radio communication unit 21 is configured to perform radio communication with the cell of the base station 10. The storage unit 22 stores various information used for the control by the control unit 23. The control unit 23 controls various functions of the radio terminal 20. In the present embodiment, the control unit 23 corresponds to a processor configured to execute programs stored in the storage unit 22 and to perform various processes.

In an idle state, the control unit 23 controls the radio communication unit 21 to receive the SIBs transmitted from the cells of the respective base stations 10 on the BCCH. It is noted that the SIB is configured to be capable of identifying a cell of a transmission source.

The control unit 23 controls the radio communication unit 21 to measure reference signal received power (RSRP) capable of being received from the respective cells on the basis of the respective parameters which is related to the cell reselection and is included in the respective SIBs (SIB3) received by the radio communication unit 21. A reference signal is configured to be capable of identifying the cell of the transmission source.

The control unit 23 performs cell reselection on the basis of the respective parameters related to the cell reselection and the received power measured by the radio communication unit 21. The cell reselection is basically determined according to a cell reselection procedure defined by the 3GPP standard (see, for example, 3GPP TS 36.304 V10.1.0 "5.2 Cell selection and reselection").

Here, when the Battery Status IE is included in the SIB, the control unit 23 performs the cell reselection taking into account the Battery Status IE.

For example, in a determination criterion of normal cell reselection, a selection priority of the cell (the base station 10) having a large remaining power amount represented by the Battery Status IE is raised. Thus, it is possible to preferentially select the base station 10 having a large remaining power amount as the standby destination without selecting the base station 10 having a small remaining power amount as the standby destination.

Alternatively, the cell (the base station 10) in which the remaining power amount represented by the Battery Status IE is smaller than a threshold value may be excluded from the standby destination. In other words, only the cell (the base station 10) in which the remaining power amount represented by the Battery Status IE is larger than the threshold value is selected as a candidate of the standby destination.

When the Battery Status IE is received multiple times from the same cell, by determining a variation state of the remaining power amount represented by each of the Battery Status IEs, only the cell in which the remaining power amount is larger than the threshold value and a variation in the remaining power amount is low (namely, the remaining power amount is stable) may be selected as the candidate of the standby destination.

In this way, when a cell of the new standby destination is selected, the control unit 23 controls the radio communication unit 21 to be on standby for the cell of the new standby destination.

It is noted that when it is detected that a tracking area (location registration area) is changed along with the cell reselection, the control unit 17 controls the radio communication unit 21 to perform a location registration process.

In addition, in an idle state, when the radio communication unit 21 receives paging (a call), or when starting of data communication by the radio terminal 20 is detected, by performing a connection process on the cell of the standby destination, the control unit 17 controls so as to transit to a connection state from the idle state.

(4) Operation of Mobile Communication System

Figure 4:
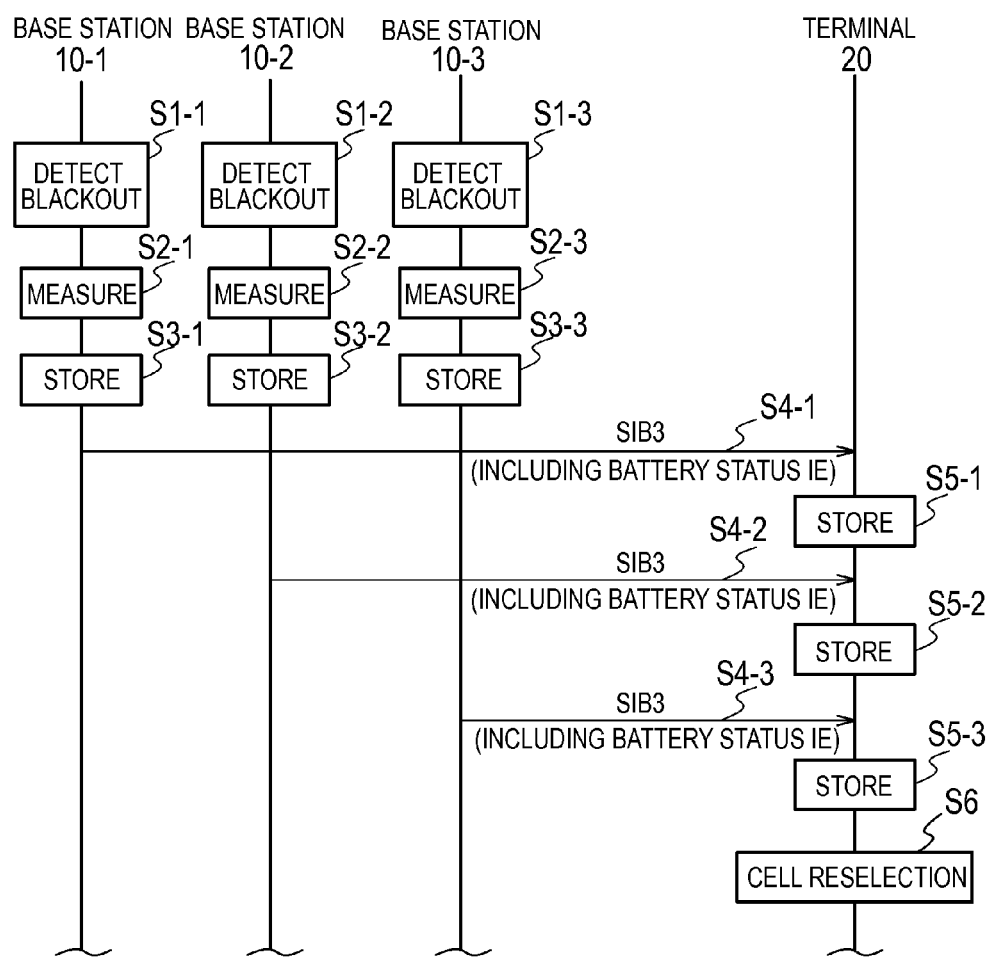
FIG. 4 is an operation sequence diagram of the mobile communication system according to the embodiment of the present invention.

Next, an operation of the mobile communication system 1 at the time of detecting the blackout will be described. FIG. 4 is an operation sequence diagram of the mobile communication system 1 at the time of detecting the blackout.

As illustrated in FIG. 4, in step S1-1 to step S1-3, the base station 10-1 to base station 10-3 detect the blackout.

In step S2-1 to step S2-3, the base station 10-1 to base station 10-3 measure the remaining power amounts thereof.

In step S3-1 to step S3-3, the base station 10-1 to base station 10-3 store the measured remaining power amounts thereof.

In step S4-1 to step S4-3, the base station 10-1 to base station 10-3 transmit the Battery Status IEs representing the stored remaining power amounts thereof while being included in the SIB3 on the BCCH.

In step S5-1 to step S5-3, the radio terminal 20 stores the relative SIB3s received from the base station 10-1 to base station 10-3.

In step S6, the radio terminal 20 performs the cell reselection according to the cell reselection procedure on the basis of the each parameter related to the cell reselection included in each of the SIB3s and the measured received power.

(5) Effect of Embodiment

As described above, according to the embodiment, the radio terminal 20 can select the cell of the base station 10 having a large remaining power amount as the standby destination in preference to the base station 10 having a small remaining power amount.

When the radio terminal 20 in the idle state transits to the connection state, the radio terminal 20 is connected to the base station 10 and communicates with the base station 10 serving as a connection destination. For this reason, as a result of an increase in a load of the base station 10 serving as the connection destination, power consumption of the base station 10 serving as the connection destination is increased.

In the present embodiment, since the number of radio terminals 20 on standby for the base station 10 having a small remaining power amount can be reduced, it is possible to prevent a load of the base station 10 having a small remaining power amount (power consumption) from being increased.

Accordingly, at the time of the blackout, since it is possible to extend a drivable time of the base station 10 having a small remaining power amount, it is possible to prevent an incommunicable area from occurring in a service area of the mobile communication system 1.

Moreover, in the present embodiment, by adding the IE of the remaining power amount information to the SIB defined by the 3GPP standard, it is possible to maintain compatibility with the existing specification.

(6) Other Embodiments

Thus, the present invention has been described with the embodiment. However, it should not be understood that those descriptions and drawings constituting a part of the present disclosure limit the present invention. From this disclosure, a variety of alternate embodiments, examples, and applicable techniques will become apparent to one skilled in the art.

In the above-described embodiment, it has been described that when the blackout is detected, the base station 10 starts the regular transmission of the remaining power amount information (the Battery Status IE).

However, recently, in order to avoid the blackout of the entire system, a power system called a planned blackout (a rolling blackouts) where the blackout is systematically performed sequentially for each region is instituted, and thus it is possible to previously know a time (a period of time) when the blackout occurs.

Thus, on the basis of information (hereinafter, referred to as planned blackout information) on the planned blackout, before a time when the blackout is planned, the base station 10 may start the regular transmission of the remaining power amount information (the Battery Status IE).

Specifically, the power control unit 172 of the base station 10 obtains the planned blackout information received by the network communication unit 132 from the network side, starts the measurement of the remaining power amount of the battery 12 before an estimated time to start the blackout on the basis of the obtained planned blackout information, and starts the regular transmission of the remaining power amount information.

In the aforementioned embodiment, although it has been described that the Battery Status IE is transmitted while being included in the SIB3, the Battery Status IE may be transmitted while being included in SIB other than the SIB3, or may be transmitted while being included in control information other than the SIB.

In the aforementioned embodiment, although it has been explained as an example where the Battery Status IE is used in the cell reselection, the Battery Status IE may be used in a handover process.

In the above-described embodiment, it has been explained that when the blackout is detected, after a predetermined time elapses from the detection of the blackout and before a time when the blackout is planned on the basis of the planned blackout information, the base station 10 performs the transmission of the remaining power amount information. However, in a mobile communication system having a plurality of the base stations 10 to be described below, each of the base stations 10 may usually perform the transmission of the remaining power amount information.

Specifically, in the case of the base station 10 driven by the power from the PV 11, the battery 12, and the power system, the power control unit 172 of the base station 10 controls so as to charge power of night time zone which is cheaper than power price of daytime zone in the battery 12, and to drive the base station 10 by the power accumulated in the battery 12 after, for example, 7 a.m. At this time, the power control unit 172 controls the base station 10 to appropriately consume the power generated in the PV 11. When there are deficits in the power from the battery 12 and the PV 11, the power control unit 172 controls to drive the base station 10 by the power from the power system secondarily. In the case of such a base station 10, since the battery 12 is one of a main power supply, each of the base stations 10 periodically transmits the remaining power amount information, so that the radio terminal 200 in the idle state can know the remaining power amount information of each of the base stations 10. Accordingly, the radio terminal 200 in the idle state can appropriately execute the cell reselection taking into account power circumstance.

Thus, it should be understood that the present invention includes various embodiments, for example, that are not described herein.

The entire content of Japanese Patent Application No. 2011-119768 (filed on May 27, 2011) is incorporated in the present specification by reference.

INDUSTRIAL APPLICABILITY

As described above, a communication control method, a base station, a radio terminal, and a processor according to the present invention are useful in a field of radio communication such as mobile communication since mobility control taking into account power circumstance can be performed in a mobile communication system that supports a SON technology.

The invention claimed is:

1. A communication control method in a base station that includes a battery and is driven by power supplied from a power system or power supplied from the battery, the method comprising:
    a step of obtaining information indicating an estimated time when the power supply from the power system is stopped; and
    a transmission step of transmitting information indicating a remaining power amount of the battery, to a radio terminal, as a cell reselection parameter, so that in the cell reselection, the radio terminal preferentially selects the cell of a base station having a relatively large remaining power amount as a standby destination, from a plurality of base stations, wherein
    the transmission step includes a step of starting the transmission of the information indicating the remaining power amount of the battery, a predetermined time prior to the estimated time when the power supply from the power system is stopped.

2. The communication control method according to claim 1, wherein
    in the transmission step, the information indicating the remaining power amount of the battery is transmitted while being included in SIB (System Information Block) defined by a 3GPP standard.

3. A communication control method in a radio terminal able to communicate with a base station that includes a battery and is driven by power supplied from a power system or power supplied from the battery, the communication control method comprising:
    a step of receiving, from each of a plurality of base stations that obtained information indicating an estimated time when the power supply from the power system is stopped, information indicating a remaining power amount of the battery of the base station as a cell reselection parameter; wherein transmission of the information indicating a remaining power amount of the battery starts a predetermined time prior to the estimated time when the power supply from the power system is stopped; and
    a step of preferentially selecting, a cell of a base station having a relatively large remaining power amount as a standby destination, from the plurality of base stations on the basis of the information indicating the remaining power amount of the battery in cell reselection.

4. A base station that includes a battery and is driven by power supplied from a power system or power supplied from the battery, the base station comprising:
    a receiver configured to receive, from the power system, information indicating an estimated time when the power supply from the power system is stopped, and
    a transmitter configured to transmit, information indicating a remaining power amount of the battery, to a radio terminal, as a cell reselection parameter, so that the radio terminal preferentially selects a cell of a base station having a relatively large remaining power amount as a standby destination, from a plurality of base stations in the cell reselection, wherein
    the transmitter transmits the information indicating a remaining power amount of the battery a predetermined time prior to the estimated time when the power supply from the power system is stopped.

5. A radio terminal able to communicate with a base station that includes a battery and is driven by power supplied from a power system or power supplied from the battery, the radio terminal comprising:
    a receiver configured to receive, from each of a plurality of base stations that obtained information indicating an estimated time when the power supply from the power system is stopped, information indicating a remaining power amount of the battery of the base station as a cell reselection parameter, wherein transmission of the information indicating a remaining power amount of the battery starts a predetermined time prior to the estimated time when the power supply from the power system is stopped; and
    a processor configured to preferentially select a cell of a base station having a relatively large remaining power amount as a standby destination, from the plurality of base stations, on the basis of the information indicating the remaining power amount of the battery in cell reselection.

6. A processor provided in a radio terminal able to communicate with a base station, wherein
    the base station includes a battery and is driven by power supplied from a power system or power supplied from the battery, and
    the processor is configured to perform
    a process for receiving, from each of a plurality of base stations that obtained information indicating an estimated time when the power supply from the power system is stopped, information indicating a remaining power amount of the battery of the base station, wherein transmission of the information indicating a remaining power amount of the battery starts a predetermined time prior to the estimated time when the power supply from the power system is stopped; and
    a process for preferentially selecting, a cell of a base station having a relatively large remaining power amount as a standby destination, from the plurality of base stations on the basis of the information indicating the remaining power amount of the battery in cell reselection.

* * * * *